Oct. 7, 1941.         C. L. FLINDT              2,257,739
           SOLE TRIMMING AND CHANNELING MACHINE
                Original Filed July 23, 1936
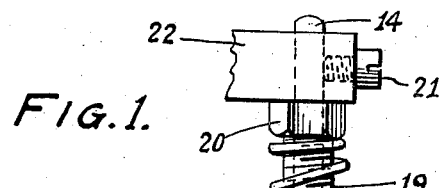
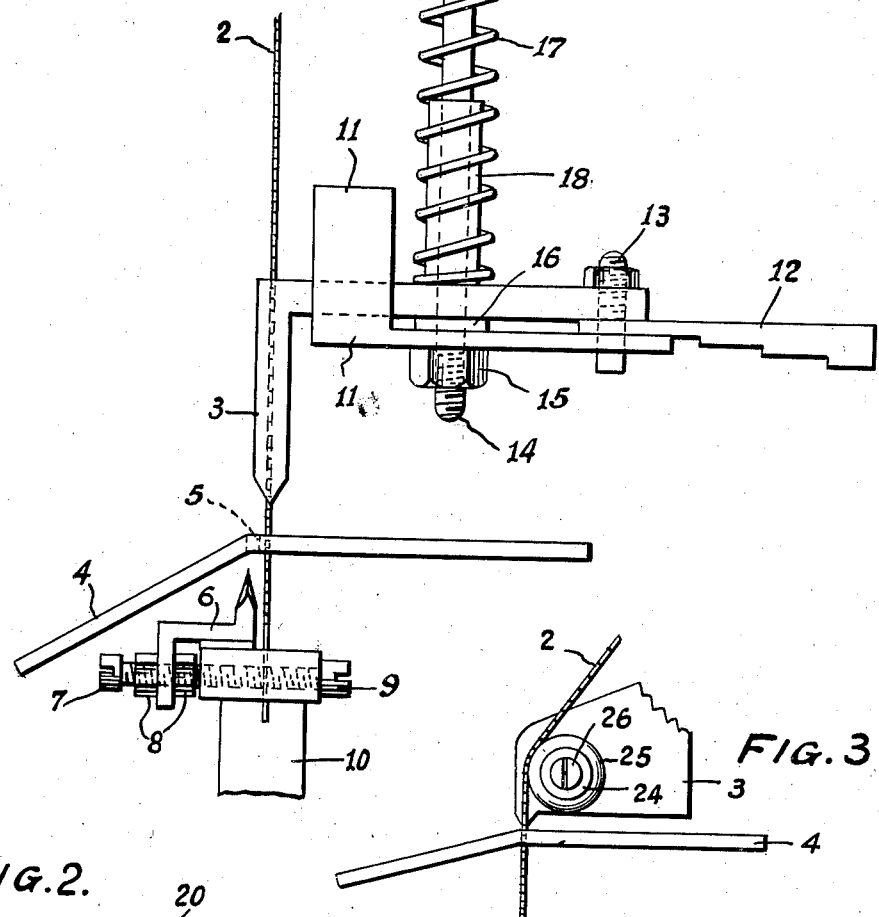
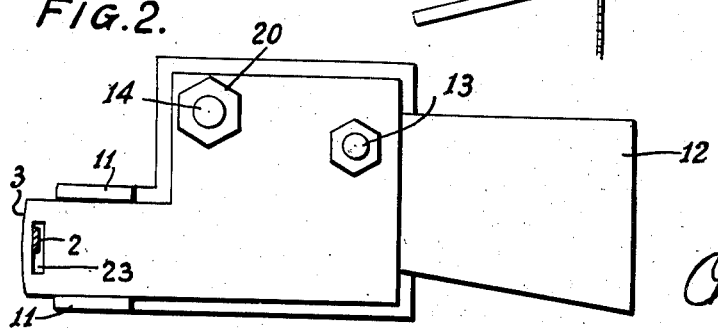
Inventor:
Charles L. Flindt Patented Oct. 7, 1941

2,257,739

UNITED STATES PATENT OFFICE 2,257,739

SOLE TRIMMING AND CHANNELING MACHINE

Charles L. Flindt, San Jose, Calif.

Application July 23, 1936, Serial No. 92,170
Renewed January 17, 1940

8 Claims. (Cl. 12—18)

This invention is useful for trimming the sole of a shoe preparatory to its introduction to the stitcher for sewing and is equally valuable for trimming up after the sewing has been done. The combination of parts claimed herein are for attaching to an ordinary jig saw, scroll saw or a band saw; however, the first mentioned is my preference and the drawing is especially made to show the application of the invention to the jig-saw type.

The general object of this invention is to provide a machine for trimming up or rough rounding the soles of shoes for use in shoe factories and shoe repair shops, which is simpler and less expensive than the machines now in use for this purpose, and has a more diversified use as a general utility machine than former machines; for it is useful for trimming heels, cutting material from stock and shaping insoles. This machine also cuts a channel in the sole, when same is of leather, in which the stitch may be housed when the sole is sewed on.

In the claims attached hereto certain improvements are featured over my Patent No. 2,051,333, filed June 29, 1935, for Sole trimming machines.

Fig. 1 is a front view of the essential parts of the machine.

Fig. 2 is a top view of the presser foot 3 and its controlling parts when disconnected from the frame 22 of the jig-saw by loosening set screw 21.

Fig. 3 is a front view of a means for creating a bend in the saw in order to make possible closer entry into the arch of the shoe in the trimming of the shank of the sole when the last is in the shoe.

The saw 2 passes through a slot in the work supporting plate 4 which fits it back of the teeth of the saw, permitting of the up and down movement characteristic of the jig-saw and insuring accurate movement at all times.

The said plate 4 is made of tool steel and tempered to a very hard degree to insure that the said slot does not wear out of true fit to the saw blade.

The presser foot 3 is in one piece from its lowest point up to and including tube 18 and fits on rod 14 in movable relation thereto. This presser foot serves to hold the work and protect the upper of the shoe from possible injury from the teeth of the saw 2 which passes through a slot therein in movable relation thereto. Rod 14 fits into a hole in part of the frame 22 of the machine in which it is tightened by set screw 21. Rod 14 has a sleeve 16 secured thereto which serves as a check controlling the lowest position at which the said presser foot rests and where it is held by spring 17.

In operation the operator grasps the gauge 12 and lifts to permit entry of the work under the presser foot and the spring 17 holds it there in self adjusting relation thereto keeping it under uniform tension or pressure. When sawing heavy leather or double thickness the gauge 12 is swung around on its pivot bolt 13 with the right hand and the presser foot is lifted with the left hand sufficient to insert the gauge 12 between presser foot 3 and guide 11 to the extent desired according to the thickness of the material being sawed. It will be noted in the drawing that the said gauge 12 has different thicknesses in step form to make it possible for the operators of the machine to lift the presser foot to that thickness he selects from the gauge which corresponds with the thickness of the material being sawed. This functions to relieve some of the pressure naturally augmented by compressing the spring sufficiently to make the presser foot take the thicker soles and by this means easier feed of the work is maintained, for the presser foot cannot bear too hard on the work when the gauge 12 is properly adjusted.

Bar 10 is part of the usual connection in a jig-saw to the driving power and has two bolts, 7 and 9 threaded therein between the ends of which one end of saw 2 is clamped. The channel cutter 6 has a hole through the lower end thereof through which bolt 7 passes and around this bolt nuts 8 screw and clamp the channel cutter between them in correct lateral position to bring the cutting edge of the channel cutter at the desired distance from the trimmed edge of the sole. The channel cutter penetrates the bottom of the sole against the resistance of spring 17 with each upward movement of the saw and the depth of the cut made is governed by the strength of the pressure exerted by spring 17; this spring can be compressed by turning down nut 20 on threaded sleeve 19 which is secured to rod 14, and when turned down causes the channel cutter to cut against greater resistance and accordingly a deeper channel is produced.

When sawing a sole to fit a welt on a shoe the operator holds the shoe with the edge of the welt against the left side of the presser foot, and the extreme lower point of the presser foot riding the work; in this way the thickness of the metal between the saw 2, Fig. 2, and the left edge of the presser foot indicates the amount of overhang the sole will have beyond the welt after being trimmed. Some operators will prefer a larger overhang than the drawing indicates and to provide for this contingency the presser foot can be turned clockwise on its axis rod 14, Fig. 2, sufficiently to move the opening 23 in the presser foot to contact with the saw 2 on its right side and a consequent thicker gauge will result to govern the sole overhang.

The nut 15 at the lower end of rod 14 serves when tightened to bind the guide 11 against sleeve 16 which is part of rod 14 in firm relation thereto and also adjusted relation controlling the lateral position of the presser foot as just above explained, for the sides of the guide fit the presser foot horizontal section in movable relation thereto but preventing looseness and play nevertheless. Pivot bolt 13 extends through a hole in guide 11 in movable relation thereto to permit of up and down movement.

As shown in the drawing the plate 4 which supports the work, slopes on one side at an angle; the object of this slope is to enable the operator to incline the shoe when sawing the shank of the shoe sole in order to gain clearance for the upper connections to the saw and still be able to cut under sufficiently. This arrangement suffices for most work and especially for repair shop use where the resoling is done without the use of lasts in the shoe which holds the arch of the upper out into a prominent and protruding position. To meet this difficulty of trimming soles in the arch or shank portion as needed in manufacturing when the lasts are in the shoes, I provide a bent saw as shown in Fig. 3. The pulley 24 around its axis, pivoted to presser foot 3, has a rubber tire 25 which contacts the saw 2 and causes it as it operates to bend at this point and consequently allows greater clearance above for the top portion of the arch held out by the last in the shoe. The saw of course is held in proper tension by the usual spring connections characteristic of jigsaws in general.

An outstanding feature and advantage of my invention is the obviating of the need for mechanical feed equipment as present in existing machines which do rough rounding by the use of chisels; the saw I use takes hold progressively on account of the shape and set of the teeth thereof and the resistance that might otherwise be encountered due to the holding power exerted by the presser foot is minimized to such an extent by the chisel bottom contacting edge of the presser foot, and the bumping effect from underneath exerted by the channel cutter, that the result in actual practice is that the feeding of the work is very easily accomplished by hand power.

Having thus described my invention what I claim as new and desire to secure by Letters Patent is:

1. The combination with a jig saw mechanism, of a blade with a sharpened edge extending along one edge of its length, means for attaching one end of the said blade to the said mechanism, means for supporting the sole of a shoe positioned to enable the said edge of the blade to be drawn against the edge of the said sole and thereby trim the same, means for holding the said sole on its support, means intermittently lifting the sole from its support to enable easier hand feeding of the work against the said blade, and means for protecting the upper of the shoe from possible injury caused by the cutting edge of the blade.

2. The combination in a sole trimming machine, of means for supporting the sole of a shoe while being trimmed, a blade for trimming the said sole having a sharpened edge; means suitably mounting the blade to enable the sharpened edge to be drawn against the said sole to trim it, means for holding the sole while being trimmed, means separating the sole from its support intermittently thereby reducing the resistance present when the work is in continual contact with its support, and rendering easier the feeding of the sole against the edge of the blade because of the said intermittent raising, means contacting both sides of the said blade in position to guide it and promote accuracy of action and smoothness of result in the trim of the sole, and means contacting the said blade in position to cause an arching away of the blade from the upper of the shoe sole to enable thereby clearance for that part of the blade passing close to the upper of the shoe when the operator of the machine trims in the arch thereof, said means enabling movement of the blade through the work when cutting, unsupported and unhampered by a carrier moving through the work with it.

3. The combination in a sole trimming machine, means for supporting the sole while being trimmed, a blade for trimming the sole said blade having saw teeth therein designed to cut the sole and remove therefrom a sawdust making room thereby for the blade to follow the cut without danger of the blade binding on the curves, means for holding the work while being trimmed, means for lifting the work from its support intermittently thereby reducing the resistance present when the work is in continual contact with its support and rendering easier hand feeding of the work against the blade because of the said intermittent raising, means for protecting the upper of the shoe from possible injury by the blade, and means for channeling the work to create a groove therein for housing the stitch when the work is sewed.

4. The combination with a jig saw mechanism of a flexible blade with a sharpened edge extending along one edge thereof and suitable mounting means for the blade, a support for the work positioned to sustain a shoe sole while the operator directs the work against the said blade to trim the sole, guiding means in the said support fitting the blade in loose fit relation thereto to insure accurate movement of the blade and a trim of the said sole at substantially right angles to the bottom of the sole when the toe and ball portions thereof are being trimmed, means obtaining clearance for that part of the said blade passing the upper of the shoe when the shank of the sole is being trimmed, means contacting the said blade at the opposite side of the sole from the said sole support in position to assist in controlling the blade to insure accurate action thereof at all times, means governing the amount of overhang the trimmed edge will have, and gauging means for taking soles of different thickness in firm or light pressure relationship as desired by the operator to assist in holding the work while trimming same.

5. The combination in a sole trimming machine, of a support for a shoe sole, a blade with a sharpened edge extending along one edge of its length for engagement with the said sole to trim same, a device for holding the said sole on its support while trimming it, gauging means obtaining holding pressure on the sole in firm or loose relationship as desired by the operator of the machine while trimming, means parallel with the blade and extending as high as the arch of the shoe for protecting from possible injury by the blade that part of the shoe upper held out prominently by the protruding part of the last in the arch when the operator trims the closely cut shank portion of the sole, a device contacting the blade to guide same permanently located adjacent the work on the supported side thereof, another blade guide device located adjacent the opposite side of the work from the supported side and together with the first mentioned guide obtaining accurate movement of the naked blade through the work, and means for gaining clearance for that part of the blade passing the arch of the shoe when the shank thereof is being trimmed.

6. The combination in a sole trimming machine, of a unit designed to vibrate a cutter up and down, means for supporting the sole of a shoe while being trimmed, a blade secured to the said unit for cutting the sole as the unit moves downward, a channel cutter attached to the said unit for creating a channel in the work as the unit moves upward, and means for protecting the upper of the shoe from possible accidental injury from the cutting edge of the blade.

7. The combination in a sole trimming machine, of a unit designed to vibrate a cutter, means for supporting the sole of a shoe while being trimmed, a blade attached to the said unit for cutting the said sole as the unit vibrates, a channel cutter attached to the said unit for creating a channel in the sole of the shoe as the unit vibrates, and means for protecting the upper of the shoe from possible accidental injury from the blade as it operates.

8. The combination with a jig saw mechanism, of a blade with a sharpened edge extending along one edge of its length, means assisting in attaching one end of the blade to the said mechanism, means assisting in supporting the work, means for holding the work on its support positioned to enable the operator to feed the work against the sharp edge of the blade to trim the same, and means for intermittently separating the work from its support to thereby reduce the resistance present when the work is in continual contact with its support and render easier the feeding of the work and means obtaining protection for the upper of the shoe from possible injury by the blade when the operator trims the shank of the sole.

CHARLES L. FLINDT.